US009235211B2

(12) United States Patent
Davidsson et al.

(10) Patent No.: US 9,235,211 B2
(45) Date of Patent: Jan. 12, 2016

(54) METHOD AND ARRANGEMENT FOR HANDOVER WARNING IN A VEHICLE HAVING AUTONOMOUS DRIVING CAPABILITIES

(71) Applicant: VOLVO CAR CORPORATION, Gothenburg (SE)

(72) Inventors: Staffan Davidsson, Vastra Frolunda (SE); Sicheng Chen, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/478,618

(22) Filed: Sep. 5, 2014

(65) Prior Publication Data

US 2015/0070160 A1    Mar. 12, 2015

(30) Foreign Application Priority Data

Sep. 12, 2013   (EP) .................................... 13184098

(51) Int. Cl.
*B60Q 1/00*   (2006.01)
*G05D 1/00*   (2006.01)
(Continued)

(52) U.S. Cl.
CPC .............. *G05D 1/0061* (2013.01); *B60K 28/06* (2013.01); *B60W 50/14* (2013.01);
(Continued)

(58) Field of Classification Search
CPC ................... B60W 2550/402; B60W 2540/26; B60W 2050/0295; B60W 2050/0071; B60W 2050/0073; B60W 2050/0025; B60W 28/06
USPC ...................... 340/457; 701/1, 7, 22, 23, 117; 180/65.285, 65.21
See application file for complete search history.

(56) References Cited

U.S. PATENT DOCUMENTS 8,433,470 B1   4/2013  Szybalski et al.
9,020,661 B2 *  4/2015  Sugihara ........... B60W 50/0098
                                                      701/2
(Continued)

FOREIGN PATENT DOCUMENTS

DE          10024227      12/2001
DE         102006039682    2/2008
(Continued)

OTHER PUBLICATIONS

European Search Report for EP 13184098, Completed by the European Patent Office on Apr. 7, 2014, 2 Pages.
(Continued)

*Primary Examiner* — John A Tweel, Jr.
(74) *Attorney, Agent, or Firm* — Brooks Kushman P.C.

(57) ABSTRACT

A method and arrangement are described for handover warning in a vehicle having autonomous driving capabilities and a vehicle controller configured to control unmanned autonomous travel. A processor may be configured to monitor if there is a need to transition from unmanned autonomous travel to manual control of the vehicle. A detecting arrangement may be configured to monitor a vehicle driver and evaluate the vehicle driver's readiness to assume the act of driving the vehicle. A warning arrangement may be configured to provide warning information when driver-handover is requested by the processor, which warning arrangement may be further configured to adapt warning information timing in respect to the evaluated vehicle driver's readiness to assume the act of driving the vehicle. A warning output system may be configured to output the time adapted warning information to a vehicle passenger compartment.

10 Claims, 2 Drawing Sheets

(51) Int. Cl.
*B60K 28/06* (2006.01)
*B60W 50/14* (2012.01)
*B60W 50/00* (2006.01)

(52) U.S. Cl.
CPC ............... *B60W 2050/0025* (2013.01); *B60W 2050/0072* (2013.01); *B60W 2050/0073* (2013.01); *B60W 2050/0096* (2013.01)

(56) References Cited

U.S. PATENT DOCUMENTS

| | | | | |
|---|---|---|---|---|
| 9,043,116 B2 * | 5/2015 | Takahashi | ........... | B60W 30/025 701/70 |
| 9,063,546 B2 * | 6/2015 | Hauler | ................. | G05D 1/0268 |
| 2012/0293316 A1 * | 11/2012 | Johnson | ................... | G09B 9/02 340/438 |
| 2014/0336897 A1 * | 11/2014 | Nordbruch | .......... | B60W 30/182 701/93 |
| 2014/0358327 A1 * | 12/2014 | Nordbruch | .......... | B60W 50/082 701/1 |
| 2015/0019042 A1 * | 1/2015 | Poechmueller | ... | B60W 50/0098 701/1 |

FOREIGN PATENT DOCUMENTS

| | | |
|---|---|---|
| DE | 102011082375 | 3/2013 |
| DE | 102011118551 | 5/2013 |
| EP | 2314490 | 4/2011 |
| JP | 11091397 | 4/1999 |

OTHER PUBLICATIONS

Extended European Search Report for EP 13184098.5, Completed by the European Patent Office, Dated Apr. 14, 2014, 5 Pages.

* cited by examiner

METHOD AND ARRANGEMENT FOR HANDOVER WARNING IN A VEHICLE HAVING AUTONOMOUS DRIVING CAPABILITIES

CROSS-REFERENCE TO RELATED APPLICATIONS

This application claims foreign priority benefits under 35 U.S.C. §119(a)-(d) to European patent application number EP 13184098.5, filed Sep. 12, 2013, which is incorporated herein by reference in its entirety.

TECHNICAL FIELD

Embodiments herein relate to an arrangement for handover warning in a vehicle having autonomous driving capabilities.

Further embodiments herein relate to a method for handover warning in a vehicle having autonomous driving capabilities.

Still further embodiments herein relate to a vehicle having autonomous driving capabilities comprising an arrangement for handover warning.

BACKGROUND

One area of automotive vehicle technology that is evolving rapidly is the area of autonomous or semi-autonomous drive capabilities. This is enabled through the introduction of sensors, for sensing vehicle parameters and surroundings, and actuators, for controlling different vehicle functionalities, such as steering, throttling and braking. Increased on-board data processing capabilities ties together these sensors and actuators such that the autonomous or semi-autonomous drive capabilities are enabled.

When the vehicle runs in autonomous mode, which means the driver does not perform maneuvers, it usually requires multiple data sources as inputs to perform the autonomous driving, such as detection of surrounding vehicles, traffic lanes, obstacles, data from navigation systems and so on. However, should one or more of these inputs not be available, there might not be sufficient information to perform autonomous driving. In such cases a driver-handover may be requested in order to ensure road safety.

A previous document, U.S. Pat. No. 8,433,470, relates to a user interface for displaying an internal state of an autonomous driving system. In the event of an emergency situation identified by a control computer of the automated vehicle, it may immediately convey this information to a passenger in a variety of ways. For example, if the control computer is no longer able to control the vehicle safely, illuminated indicators may change color, to inform the user of the immediate need to take control of the steering wheel. The control computer may also send audio alerts to the passenger stating that there is an emergency and the passenger is required to take control of the steering wheel. The control computer may further use cameras to scan the passenger's eyes and/or other features. If the control computer determines that the eyes are closed or the body is slumped over (e.g. the passenger is sleeping or under the influence of drugs or alcohol), the control computer may take emergency control of the vehicle and use audible alerts to wake or otherwise get the attention of the driver.

However, during autonomous driving a vehicle driver may be otherwise occupied e.g. resting, reading, watching a movie or similar, which depending on the circumstances will affect the vehicle driver's readiness to respond to a request to assume manual control of the vehicle.

SUMMARY

Embodiments herein aim to provide an improved arrangement for handover warning in a vehicle having autonomous driving capabilities and a vehicle controller arranged to control unmanned autonomous travel.

This is provided through an arrangement comprising: monitoring means, arranged to monitor if there is a need to transition from unmanned autonomous travel to manual control of the vehicle; a detecting arrangement, arranged to monitor a vehicle driver and evaluate the vehicle driver's readiness to assume the act of driving the vehicle; a warning arrangement, arranged to provide warning information when driver-handover is requested by the monitoring means, which warning arrangement is further arranged to adapt warning information timing in respect to the evaluated vehicle driver's readiness to assume the act of driving the vehicle; a warning output system, arranged to output the time adapted warning information to a vehicle passenger compartment.

Utilizing an arrangement of the above kind provides for ensuring that an inactive vehicle driver is given adequate time to prepare for a handover from unmanned autonomous travel to manual control of the vehicle.

According to a second aspect the warning arrangement is further arranged to adapt warning information timing such that the warning output system will output the warning information earlier if the vehicle driver's readiness to assume the act of driving the vehicle is detected as low, and later if the vehicle driver's readiness to assume the act of driving the vehicle is detected as high.

Through adapting the warning information timing as above is provided for tailoring the amount of time given an inactive vehicle driver to prepare for a handover from unmanned autonomous travel to manual control of the vehicle to the current readiness level of the vehicle driver.

According to a third aspect the warning arrangement is further arranged to adapt warning information emergency such that the warning output system will output the warning information with higher emergency if the vehicle driver's readiness to assume the act of driving the vehicle is detected as low, and lower emergency if the vehicle driver's readiness to assume the act of driving the vehicle is detected as high.

Through adapting the warning information emergency as above is provided for tailoring the emergency level of the warning information to the current readiness level of the vehicle driver, such that the emergency of the warning information corresponds to the amount of time given an inactive vehicle driver to prepare for a handover from unmanned autonomous travel to manual control of the vehicle.

According to a fourth aspect the detecting arrangement further comprises driver monitoring sensors and input arrangements comprising at least one of a driver monitoring camera, a steering wheel torque sensor and a seat position detection arrangement.

The provision of driver monitoring sensors and input arrangements as above provides for qualitative determination of the current readiness level of the vehicle driver.

According to a fifth aspect the monitoring means are arranged to monitor the availability of inputs to the vehicle controller for monitoring if these are sufficient for maintaining unmanned autonomous travel of the vehicle or if there is a need to transition from unmanned autonomous travel to manual control of the vehicle.

The provision of monitoring if inputs to the vehicle controller are sufficient for maintaining unmanned autonomous travel of the vehicle provides the monitoring means with a qualitative base for its driver-handover requests.

According to a sixth aspect the monitoring means are arranged to monitor the availability of inputs to the vehicle controller comprising inputs from at least one of onboard systems for detection of surrounding vehicles, detection of traffic lanes, detection of obstacles and systems for providing navigation data.

The provision of monitoring the availability of inputs from at least one of onboard systems for detection of surrounding vehicles, detection of traffic lanes, detection of obstacles and systems for providing navigation data provides the monitoring means with a qualitative base for its driver-handover requests.

According to a seventh aspect the detecting arrangement further comprises driver monitoring sensors and input arrangements comprising a driver gaze direction determining arrangement.

The provision of a driver gaze direction determining arrangement provides for determining if the driver's eyes are on or off the road, which is useful for evaluating the vehicle driver's readiness to assume the act of driving the vehicle.

According to an eighth aspect the warning output system, is arranged to output the time adapted warning information to the vehicle passenger compartment as at least one of a visual warning, an audio warning and a haptic warning.

The provision of the time adapted warning information as at least one of a visual warning, an audio warning and a haptic warning provides for a high degree of certainty that the vehicle driver will be able to perceive the warning information.

According to a ninth aspect a motor vehicle having autonomous driving capabilities is provided which comprises an arrangement for handover warning, as described herein.

A motor vehicle having autonomous driving capabilities comprising an arrangement for handover warning, as described herein, will ensure that an inactive vehicle driver is given adequate time to prepare for a handover from unmanned autonomous travel to manual control of the vehicle.

According to a tenth aspect is further provided a method for handover warning in a vehicle having autonomous driving capabilities and a vehicle controller, arranged to control unmanned autonomous travel.

This is provided through a method comprising the steps of: monitoring if there is a need to transition from unmanned autonomous travel to manual control of the vehicle using monitoring means; monitoring a vehicle driver and evaluating the vehicle driver's readiness to assume the act of driving the vehicle using a detecting arrangement; providing warning information when driver-handover is requested by the monitoring means, and adapting warning information timing in respect to the evaluated vehicle driver's readiness to assume the act of driving the vehicle using a warning arrangement; and outputting the time adapted warning information to a vehicle passenger compartment using a warning output system.

Utilizing a method for handover warning in a vehicle having autonomous driving capabilities as above provides for an efficient method that allows for ensuring that an inactive vehicle driver is given adequate time to prepare for a handover from unmanned autonomous travel to manual control of the vehicle.

BRIEF DESCRIPTION OF THE DRAWINGS

In the following, embodiments herein will be described in greater detail by way of example only with reference to attached drawings, in which.

Figure 1:
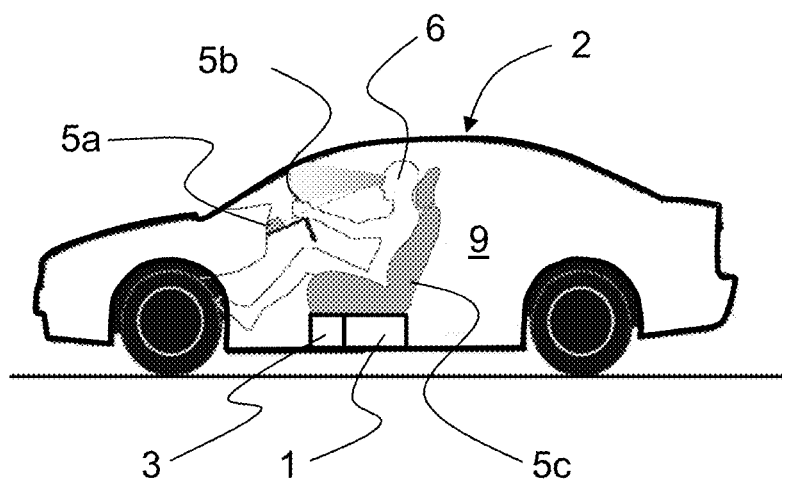
FIG. 1 is a schematic illustration of a vehicle having autonomous driving capabilities comprising an arrangement for handover warning according to embodiments hereof.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein. Like reference numerals designate like elements throughout the specification.

DETAILED DESCRIPTION

Embodiments herein will now be described more fully with reference to the accompanying drawings, in which example embodiments are shown. However, this application should not be construed as limited to the embodiments set forth herein. Disclosed features of example embodiments may be combined as readily understood by one of ordinary skill in the art to which this application belongs. Unless explicitly described to the contrary, the word "comprise" and variations such as "comprises" or "comprising" will be understood to imply the inclusion of stated elements but not the exclusion of any other elements.

FIG. 1 is a schematic illustration of a vehicle 2 having autonomous driving capabilities comprising an arrangement 1 for handover warning according to embodiments hereof.

For simplicity only passenger car vehicles 2 will be considered in the following description. However, the teachings provided herein may be expanded to consider commercial vehicles, such as buses, trucks and similar vehicles having autonomous driving capabilities, without loss of generality.

Figure 2:
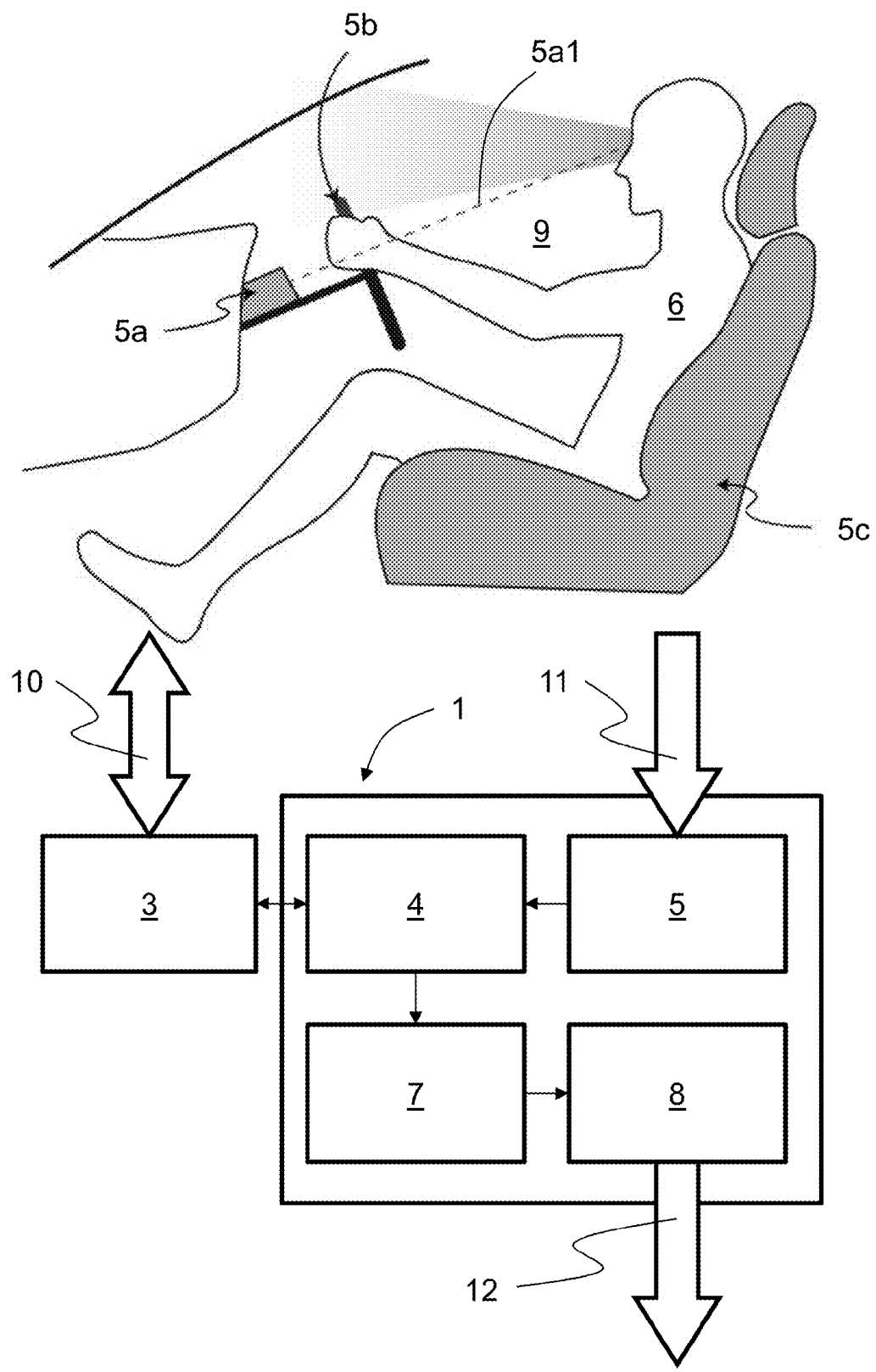
FIG. 2 is a schematic illustration of an arrangement for handover warning in a vehicle having autonomous driving capabilities according to FIG. 1.

FIG. 2 illustrates the arrangement 1 for handover warning in a vehicle 2 having autonomous driving capabilities and a vehicle controller 3, arranged to control unmanned autonomous travel according to an exemplary embodiment.

A vehicle 2 having autonomous driving capabilities will include a vehicle controller 3 for controlling unmanned autonomous driving, which may include a processor or the like, and which may include a memory and computer executable instructions for performing operations associated therewith and/or described herein. The vehicle controller 3 will e.g. pursue a route to a final destination, and control the vehicle 2 so that the vehicle 2 can perform autonomous driving along the route to the final destination in an unmanned manner. Usually, when a fixed or movable obstacle is present in the route to the final destination, the vehicle controller 3 will detect the object, using vehicle 2 sensor systems (not shown) such as one or more of a Radio Detection And Ranging (RADAR) sensor, a Light Detection And Ranging (LIDAR) sensor, a Light Amplification by Stimulated Emission of Radiation (LASER) sensor, an ultrasound sensor, an infrared sensor, an image sensor, or any combination thereof.

Thereafter the vehicle controller 3 will control vehicle 2 actuators (not shown), such as steering, braking and throttle actuators, in order to avoid the detected obstacle, or temporarily halt vehicle 2 travel in order to avoid a collision with the detected object.

The arrangement 1 comprises a monitoring arrangement or monitoring means 4, arranged to monitor if there is a need to transition from unmanned autonomous travel to manual control of the vehicle 2. The monitoring arrangement or monitoring means 4 may comprise a processor or the like (not shown), which may include memory and stored computer executable instructions for performing operations such as those described herein, which is arranged to monitor one or more vehicle parameters while the vehicle 2 is performing autonomous driving. The term parameter is here used to identify a characteristic, a feature, a measurable factor or any other kind of recordable data which relates to a scenario where the vehicle 2 is performing autonomous driving.

A detecting arrangement 5, is arranged to monitor a vehicle driver 6 and evaluate the vehicle driver's readiness to assume the act of driving the vehicle 2. The vehicle driver's readiness to assume the act of driving the vehicle 2 may be detected as low or high, or graded anywhere there in-between. Evaluation of the vehicle driver's 6 readiness to assume the act of driving the vehicle 2 may be evaluated in dependence on whether the vehicle driver 6 is assuming a posture appropriate for the driving situation with respect to operating controls of the vehicle 2, such as steering wheel and pedals. The driver arrangement 5 may comprise a processor or the like, and may include a memory and stored computer executable instructions for performing the operations described herein.

A warning arrangement 7 is arranged to provide warning information when driver-handover is requested by the monitoring means 4. The warning arrangement 7 is further arranged to adapt warning information timing in respect to the evaluated vehicle driver's readiness to assume the act of driving the vehicle 2. The warning arrangement 7 may comprise a processor or the like, and may include a memory and stored computer executable instructions for performing the operations described herein.

A warning output system 8 is arranged to output the time adapted warning information (illustrated in FIG. 2 by arrow 12) to a vehicle 2 passenger compartment 9. In some embodiments hereof the warning output system 8, is arranged to output the time adapted warning information to the vehicle 2 passenger compartment 9 as at least one of a visual warning, an audio warning and a haptic warning.

In case of visual warning information, the warning output system 8 may for example include and the warning may be output by means of one or more lamps or display devices (nor shown). In case of audio warning information, the warning output system 8 may for example include and the warning may be output by one or more speakers or horns in the form of e.g. a signal tone or voice announcement. In case of haptic warning information, the warning output system 8 may for example include and the warning may be provided through vibrating the steering wheel, the driver seat or the accelerator pedal.

In a further embodiment hereof the warning arrangement 7 is arranged to adapt warning information timing such that the warning output system 8 will output the warning information earlier if the vehicle driver's readiness to assume the act of driving the vehicle 2 is detected as low, and later if the vehicle driver's readiness to assume the act of driving the vehicle 2 is detected as high.

Warning information timing may be adapted continuously should the evaluated vehicle driver's 6 readiness to assume the act of driving the vehicle 2 be graded anywhere in-between low or high and corresponding to the current grading. This enables a linear tailoring of the amount of time given an inactive vehicle driver 6 to prepare for a handover from unmanned autonomous travel to manual control of the vehicle 2 to a current readiness level of the vehicle driver 6.

In a still further embodiment hereof the warning arrangement 7 is arranged to adapt warning information emergency such that the warning output system 8 will output the warning information with higher emergency if the vehicle driver's readiness to assume the act of driving the vehicle 2 is detected as low, and lower emergency if the vehicle driver's readiness to assume the act of driving the vehicle 2 is detected as high.

Warning information emergency may be adapted continuously should the evaluated vehicle driver's 6 readiness to assume the act of driving the vehicle 2 be graded anywhere in-between low or high and corresponding to the current grading. This enables a linear tailoring of the emergency of the warning information which corresponds to the amount of time given an inactive vehicle driver 6 to prepare for a handover from unmanned autonomous travel to manual control of the vehicle 2.

In certain embodiments hereof the detecting arrangement 5 further comprises driver monitoring sensors and input arrangements (illustrated in FIG. 2 by arrow 11) comprising at least one of a driver monitoring camera 5a, a steering wheel torque sensor 5b and a seat position detection arrangement 5c. The driver monitoring camera 5a may comprise processing means for performing image analysis, such as a processor or the like, which may include a memory and computer executable instructions for performing operations such as those described herein, e.g. for determining a position of the vehicle driver 6. Use of driver monitoring sensors and input arrangements of the above described kinds provides for qualitative determination of the current readiness level of the vehicle driver 6.

In embodiments hereof the monitoring means 4 are arranged to monitor the availability of inputs to the vehicle controller 3 for monitoring if these are sufficient for maintaining unmanned autonomous travel of the vehicle 2 or if there is a need to transition from unmanned autonomous travel to manual control of the vehicle 2.

According to some embodiments hereof the monitoring means 4 are arranged to monitor the availability of inputs (illustrated in FIG. 2 by arrow 10) to the vehicle controller 3 comprising inputs from at least one of onboard systems for detection of surrounding vehicles, detection of traffic lanes, detection of obstacles and systems for providing navigation data. Onboard systems of the above kind may comprise systems such as a navigation system, such as a global positioning system (GPS) or equivalent, cruise control systems, so-called ACC (Adaptive Cruise Control) systems, which monitor the front area of the vehicle 2, with the aid of e.g. a radar sensor, and automatically regulate the distance to a preceding vehicle, as well as automatic lane-keeping systems and combinations of such systems.

In further embodiments hereof the detecting arrangement 5 further comprises driver monitoring sensors and input arrangements comprising a driver gaze direction determining arrangement 5a1. Hereby, for instance, it may be determined by the arrangement 1 for handover warning that a driver 6 whose eyes are off the road will have lower readiness of responding when the vehicle 2 cannot perform autonomous driving. In such a situation, the apparatus will present warning information earlier and give the driver 6 longer time to prepare for the handover of the task of manually driving the vehicle 2.

According to the present application is also envisaged a motor vehicle 2 having autonomous driving capabilities and a vehicle controller 3 arranged to control unmanned autonomous travel that comprises an arrangement 1 for handover warning, as described herein.

Further, according to the present application is also envisaged a method for handover warning in a vehicle 2 having autonomous driving capabilities and a vehicle controller 3 arranged to control unmanned autonomous travel. The proposed method comprises the steps of: monitoring if there is a need to transition from unmanned autonomous travel to manual control of the vehicle 2 using monitoring means 4; monitoring a vehicle driver 6 and evaluating the vehicle driver's readiness to assume the act of driving the vehicle 2 using a detecting arrangement 5; providing warning information when driver-handover is requested by the monitoring means 4, and adapting warning information timing in respect to the evaluated vehicle driver's readiness to assume the act of driving the vehicle 2 using a warning arrangement 7; and outputting the time adapted warning information to a vehicle 2 passenger compartment 9 using a warning output system 8.

In accordance with the teachings hereof, use of vehicles 2 having autonomous driving capabilities with the proposed arrangement 1 for handover warning will ensure that an inactive vehicle driver 6 is given adequate time to prepare for a handover from unmanned autonomous travel to manual control of the vehicle 2.

Furthermore, accidents can be avoided as a driver 6 of an autonomously controlled vehicle 2 will be provided warning information such that a timely response can be made by the driver should a request to assume manual control of the vehicle 2 be issued. It should also be noted that any of the arrangements, means, systems, controllers or the like described herein may comprise a processor or the like, which may include a memory and stored computer executable instructions for performing the operations associated therewith and/or described herein.

Although the above description only describes passenger car vehicles 2, the teachings provided herein may, without loss of generality, be expanded to consider commercial vehicles, such as buses, trucks and similar vehicles having autonomous driving capabilities, without loss of generality. The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure.

What is claimed is:

1. An arrangement for handover warning in a vehicle having autonomous driving capabilities and a vehicle controller arranged to control unmanned autonomous travel, the arrangement comprising:
   monitoring means for monitoring if there is a need to transition from unmanned autonomous travel to manual control of the vehicle;
   a detecting arrangement configured to monitor a vehicle driver and evaluate the vehicle driver's readiness to assume an act of driving the vehicle;
   a warning arrangement configured to provide warning information when driver-handover is requested by the monitoring means, which warning arrangement is further configured to adapt warning information timing in respect to the vehicle driver's evaluated readiness to assume the act of driving the vehicle;
   a warning output system configured to output the adapted warning information timing to a vehicle passenger compartment.

2. The arrangement according to claim 1 wherein the warning arrangement further is configured to adapt warning information timing such that the warning output system will output the warning information earlier if the vehicle driver's readiness to assume the act of driving the vehicle is detected as low, and later if the vehicle driver's readiness to assume the act of driving the vehicle is detected as high.

3. The arrangement according to claim 1 wherein the warning arrangement further is configured to adapt warning information urgency such that the warning output system will output the warning information with higher urgency if the vehicle driver's readiness to assume the act of driving the vehicle is detected as low, and lower urgency if the vehicle driver's readiness to assume the act of driving the vehicle is detected as high.

4. The arrangement according to claim 1 wherein the detecting arrangement further comprises driver monitoring sensors and input arrangements comprising at least one of a driver monitoring camera, a steering wheel torque sensor and a seat position detection arrangement.

5. The arrangement according to claim 1 wherein the monitoring means are for monitoring availability and sufficiency of inputs to the vehicle controller for maintaining unmanned autonomous travel of the vehicle or if there is a need to transition from unmanned autonomous travel to manual control of the vehicle.

6. The arrangement according to claim 5 wherein the monitoring means are for monitoring availability of inputs to the vehicle controller comprising inputs from at least one of onboard systems for detection of surrounding vehicles, detection of traffic lanes, detection of obstacles and systems for providing navigation data.

7. The arrangement according to claim 4 wherein the detecting arrangement further comprises driver monitoring sensors and input arrangements comprising a driver gaze direction determining arrangement.

8. The arrangement according to claim 1 wherein the warning output system is configured to output the adapted warning information timing to the vehicle passenger compartment as at least one of a visual warning, an audio warning and a haptic warning.

9. A motor vehicle having autonomous driving capabilities and a vehicle controller configured to control unmanned autonomous travel, the vehicle comprising an arrangement for handover warning according to claim 1.

10. A method for handover warning in a vehicle having autonomous driving capabilities and a vehicle controller configured to control unmanned autonomous travel, the method comprising:
- monitoring if there is a need to transition from unmanned autonomous travel to manual control of the vehicle using a monitoring arrangement;
- monitoring a vehicle driver and evaluating the vehicle driver's readiness to assume an act of driving the vehicle using a detecting arrangement;
- providing warning information when driver-handover is requested by the monitoring arrangement, and adapting warning information timing in respect to the evaluated vehicle driver's readiness to assume the act of driving the vehicle using a warning arrangement; and
- outputting the adapted warning information timing to a vehicle passenger compartment using a warning output system.

* * * * *